June 11, 1963  G. W. SCHAUER, JR  3,093,722
DOMESTIC HEATING APPLIANCE
Original Filed June 29, 1960

| POSITION | CONTACTS | | | | | | | | | |
|---|---|---|---|---|---|---|---|---|---|---|
| | A | B | C | D | E | F | G | H | J | K |
| OFF | | | | | | | | X | X | |
| PREHEAT | C | C | X | X | | | | X | | X | X |
| LOW | X | X | X | X | C | X | | X | | |

X = CLOSED      C = CYCLING

INVENTOR.
George W. Schauer, Jr.
BY
Frederick M. Ritchie
His Attorney

3,093,722
DOMESTIC HEATING APPLIANCE

George W. Schauer, Jr., Dayton, Ohio, assignor to General Motors Corporation, Detroit, Mich., a corporation of Delaware
Continuation of application Ser. No. 39,546, June 29, 1960. This application Feb. 23, 1962, Ser. No. 176,860
11 Claims. (Cl. 219—20)

This invention relates to a domestic appliance and more particularly to an improved oven roasting control circuit for an electric range. This is a continuation of my copending application Serial No. 39,546, filed June 29, 1960, now abandoned.

Early studies have shown that certain advantages occur in roasting meats for extended periods at relatively low temperatures. The results of such studies have proven that cheaper cuts of meat can be roasted to a tender doneness with less waste since the roasting is done at temperatures below approximately 170° F. With low temperature roasting, timing need not be accurate; the important thing is to allow enough time for the size cut being roasted. Protein does not toughen. The gelatin is softened and made sufficiently tender to eat without melting. Thus, the juices are kept in the meat and there is relatively little loss in weight. The longer the meat cooks, the more tender it becomes.

At temperatures above approximately 170° F., there appears to be some chemical reaction which toughens the protein in the meat. If meats are cooked too long at high temperatures, the connective tissue of meat (gelatin) melts, the juices are lost, and there remains only tough, stringy, dry fibers. Although the desirability of such low temperature roasting has been known before, no system has been embodied in a domestic range for the purpose of putting into practice these low temperature roasting concepts. Thus, it is an object of this invention to provide an improved control circuit for an electric oven.

Accordingly, it is an object of this invention to provide an automatic low temperature roasting control circuit which will provide in an oven a brief period of high temperature wherein the meat can be browned and the juices sealed in followed by an extended period at temperatures below approximately 170° F.

It is also an object of this invention to incorporate a timing system in conjunction with a low temperature roasting control circuit such that the low temperature control circuit becomes effective only after a predetermined period of high temperature.

A further object of this invention is the provision of a timing means for a low temperature control circuit which may be preset in accordance with the weight and type of meat to be roasted.

A more general object of this invention is the provision of an oven control circuit with a low temperature thermostatic means, a high temperature thermostatic means and timing means for selecting one or the other of said thermostatic means.

Further objects and advantages of the present invention will be apparent from the following description, reference being had to the accompanying drawing wherein a preferred embodiment of the present invention is clearly shown.

Figure 1:
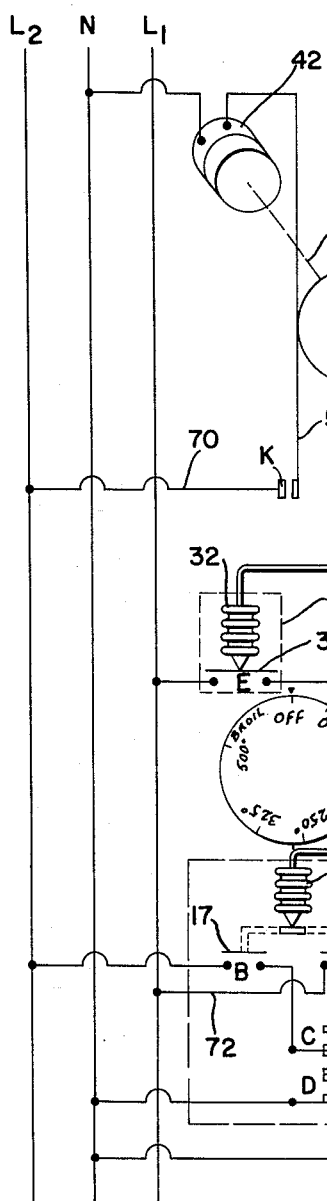
FIGURE 1 is a schematic wiring diagram of this invention.

In accordance with this invention and with reference to FIGURE 1, a schematic wiring diagram of the proposed control circuit for low temperature roasting is set forth.

Figure 2:
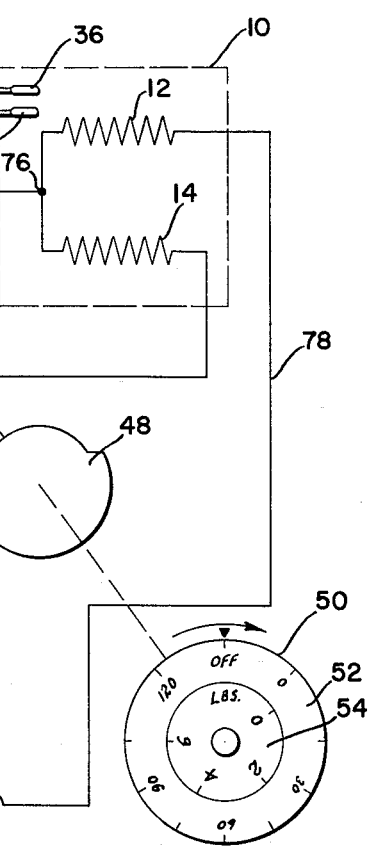
FIGURE 2 is a cycle chart showing the positioning of the various switch contacts in the diagram of FIGURE 1.

FIGURE 2 shows a cycle chart indicating the specific open, closed or cycling condition of the various contacts depicted in FIGURE 1. The circuitry is proposed for use with an oven 10 which includes a broil heating unit 12 and a bake heating unit 14. A conventional thermostat, shown generally at 16, is utilized to control the temperatures within the oven 10 during normal high temperature baking operations. The thermostat 16 includes a pair of contacts A and B opened and closed by switches 15, 17 respectively. The switches 15, 17 are cycled intermittently by a hydraulic bellows 18 motivated by way of a capillary tube 20 and a sensing bulb 22 within the oven 10. The rate at which the contacts A and B are cycled is dependent upon the presetting of a standard oven temperature control knob 24, the preset temperature being sensed by the bulb 22 within the oven. Thus, if the knob 24 is set for 325° F., the contacts A and B will open and close to maintain the selected temperature (325° F.) within the oven. The thermostat 16 also includes interlock contacts C and D for selectively connecting the broil unit 12 and the bake unit 14 for either 118 volt or 236 volt operation.

The foregoing description has set forth only the conventional high temperature responsive oven control circuit. To provide a low temperature roasting control circuit, certain auxiliary equipment must be added. The standard thermostat 16 in use today is calibrated for accuracy in the range from 250° F. to approximately 500° F. As aforesaid, the advantages of low temperature roasting are attained only below the 170° F. mark where the standard thermostat 16 is least accurate. For this reason, a low temperature thermostat 30 is included and supplied with a set of low temperature controls E intermittently opened and closed by a switch 31 operated by a hydraulic bellows 32 through a capillary tube 34 leading to a temperature sensing bulb 36 within the oven 10. The low temperature thermostat 30 is preset to maintain the oven 10 at approximately 160° F. At this low temperature the meat will roast slowly without waste and without the meat fibers becoming toughened.

The control circuit is completed by the addition of a timer 40 which cooperates with the low temperature thermostat 30 and the standard oven high temperature thermostat 16 to selectively place one or the other in the control circuit for the oven heating elements 12 and 14. The timer 40 is comprised of a timer motor 42, a timer motor cam 44, a thermostat selector cam 46, a bake unit power supply cam 48 and a low temperature control knob 50. Note that the control knob 50 may be calibrated either in time, as at 52, or in weight of the roast, as at 54. The timer motor cam 44 acts to position a cam actuated switch 56 to open and close a contact K in accordance with the energization of the timer motor 42. Further, the thermostat selector cam 46 actuates a cam switch blade 58 between a low temperature thermostat contact F and a high temperature thermostat contact G. When the switch blade 58 is against the contact G, the standard thermostat 16 is in series electrical flow relationship with the broil and bake heating elements 12 and 14, respectively. Conversely, when the cam actuated switch blade 58 is in engagement with the contact F, the low temperature thermostat 30 is placed into control relationship with the oven heating elements. Lastly, the bake heating element cam 48 positions a cam actuated switch 60 between a high voltage contact J and a low voltage contact H. When the bake heating element 14 is energized through the contact J, it operates on 236 volts, this situation occurring during preheat operation. However, when the cam actuated switch 60 is closed on contact H, the bake heating element 14 is energized for a 118-volt operation, this situation occurring during low temperature roasting.

FIGURE 2 may be referred to in determining the position of the various sets of contacts A, B, C, D, E, F, G, H, J and K during the OFF, PREHEAT or LOW portions of the low temperature roasting cycle. In operation, let us assume that a housewife is prepared to cook an inexpensive, five-pound roast using the low temperature circuitry of this invention. She will place the roast within the oven 10 and set the standard thermostat control knob 24 for approximately 325° F. At the same time, she will position the browning or low temperature time knob 50 to the weight of the meat or roast (say five pounds on the dial portion 54 or approximately ninety minutes of the dial portion 52). The low temperature control circuitry is now placed into the PREHEAT position. Contacts C, D, G, J and K are closed positively while contacts A and B are cycling in accordance with the temperature within the oven 10 as prescribed by the setting on dial 24, 325° F. in this instance. Thus, timer motor 42 is energized from $L_2$, line 70, contact K, cam actuated switch 56, the timer motor 42 to the neutral (N) side of the power supply. As the cycle is initiated, the heating elements 12 and 14 will be energized as follows: from $L_1$ through line 72, contacts A, line 74, contact G, cam actuated switch blade 58 to the junction 76 of the broil heating element 12 and the bake heating element 14. From this point 76, the broil element 12 will be energized by way of line 78, contacts D to the neutral side of the line N, thus placing the broil unit 12 on 118-volt operation.

At the same time, the bake heating element 14 will be energized from the junction point 76 by way of the cam actuated switch blade 60, the contact J, contacts C, cycling contacts B to the other side of the line $L_2$, thereby placing the bake heating element 14 on 236-volt operation for rapid preheat of the oven 10. The temperature within the oven 10 will quickly reach the presetting on the knob 24, namely 325° F., and the contact A and B will cycle to maintain the presetting for the length of time prescribed on the browning time knob 50.

At the expiration of the time programmed by the knob 50 (ninety minutes in the case of our five-pound roast), the circuitry for extended low temperature roasting will automatically be established. Thus, the contact K will be opened to deenergize the timer motor 42. Simultaneously, the contact G will be opened and the contact F closed to place the low temperature thermostat into the oven heating element circuit instead of the high temperature thermostat 16. Lastly, the cam 48 will reposition the switch 60 from contact J to contact H to establish 118-volt power supply to the bake heating element 14. The low temperature roasting operation thus established will then continue with both heating elements 12 and 14 energized for 118-volt operation. The heating elements will be cycled in accordance with the temperature sensed by the bulb 36 and transmitted to the bellows 32. Since the thermostat 30 is set for approximately 160° F. operation, the temperatures within the oven 10 will be maintained at this low value throughout the balance of the low temperature roasting operation. This low temperature roasting operation may continue for approximately 24 hours before the roasting process is completed. No provision is included for terminating the low temperature roasting cycle. However, this omission is not believed significant since a leeway of two or three hours in either direction while using the low temperature roasting technique of this invention is acceptable without significantly changing the end result. The meat will be cooked with a minimum loss of weight and with a degree of tenderness not formerly possible at the conventional higher roasting temperatures.

While the embodiment of the present invention as herein disclosed constitutes a preferred form, it is to be understood that other forms might be adopted.

What is claimed is as follows:

1. An automatic roasting control for effecting a preheat cooking operation and a low temperature cooking operation in an oven having a bake heating element and a broil heating element comprising; a power supply; a low oven temperature thermostat having a low temperature switch responsive to temperatures in said oven; a high oven temperature thermostat having first and second switches responsive to temperatures in said oven; a timing means having a thermostat selector cam actuated switch connected to said heating elements and operating between a low temperature thermostat contact and a high temperature thermostat contact and a bake heating element power supply cam actuated switch connected to said bake heating element and operating between a high voltage contact and a low voltage contact; first circuit means connecting said power supply, said low temperature switch and said low temperature thermostat contact; second circuit means connecting said power supply, said second switch and said high temperature thermostat contact; third circuit means connecting said power supply, said first switch and said high voltage contact; fourth circuit means connecting said power supply to said low voltage contact; and fifth circuit means connecting said power supply and said broil heating element; said timing means adapted to close said high temperature thermostat contact and said high voltage contact during said preheat cooking operation; and said timing means being adapted to close said low temperature thermostat contact and said low voltage contact during said low temperature cooking operation.

2. An automatic roasting control for effecting a preheat cooking operation and a low temperature cooking operation in an oven having a bake heating element and a broil heating element comprising; a power supply having first and second line conductors and a neutral; a low oven temperature thermostat having a low temperature switch responsive to temperatures in said oven; a high oven temperature thermostat having first, second, third and fourth switches; said first and second switches being responsive to temperatures in said oven during said preheat cooking operation and closed during said low temperature cooking opertion; said third and fourth switches being closed during both of said operations; a timing means having a timer motor, a cam shaft operated by said timer motor, a timer motor cam shaft actuated switch connected to said timer motor, a thermostat selector cam shaft actuated switch connected to said heating elements and operating between a low temperature thermostat contact and a high temperature thermostat contact and a bake heating element power supply cam shaft actuated switch connected to said bake heating element and operating between a high voltage contact and a low voltage contact; a timer motor contact selectively engageable by said timer motor cam shaft actuated switch and connected to one of said first and second line conductors; first circuit means connecting said neutral and said timer motor; second circuit means connecting said first line conductor, said low temperature switch and said low temperature thermostat contact; third circuit means connecting said first line conductor, said second switch and said high temperature thermostat contact; fourth circuit means connecting said second line conductor, said first switch, said third switch and said high voltage contact; fifth circuit means connecting said neutral to said low voltage contact; and sixth circuit means connecting said neutral, said fourth switch and said broil heating element; said timing means adapted to close said high temperature thermostat contact, said high voltage contact and said timer motor contact during said preheat cooking operation; and said timing means being adapted to close said low temperature thermostat contact and said low voltage contact during said low temperature cooking operation.

3. A control circuit for an oven having a bake heating element and a broil heating element in parallel circuit relationship comprising, a high temperature thermostat accurately responsive to high temperatures in said oven, a low temperature thermostat accurately responsive to low temperature in said oven, said thermostats being in parallel circuit relationship with each other and in series circuit relationship with said heating elements, first switch means for connecting one of said thermostats with said heating elements, second switch means for selectively connecting said broil heating element for high or low heat output, third switch means for selectively connecting said bake heating element for high or low heat output, and timer means for controlling certain of said switch means in a manner to energize said broil heating element for low heat output and said bake heating element for high heat in series with said high temperature thermostat during a first operation and said timer means automatically terminating said first operation and controlling certain of said switch means in a manner to energize said broil heating element for low heat output and said bake heating element for low heat output in series with said low temperature thermostat during a second operation.

4. A control circuit for an oven having a bake heating element and a broil heating element in parallel circuit relationship comprising, a high temperature thermostat accurately responsive to high temperatures in said oven, a low temperature thermostat accurately responsive to low temperatures in said oven, said thermostats being in parallel circuit relationship with each other and in series circuit relationship with said heating elements, first switch means for connecting one of said thermostats with said heating elements, second switch means for selectively connecting said broil heating element for high or low heat output, third switch means for selectively connecting said bake heating element for high or low heat output, and timer means for controlling said first and third switch means in a manner to energize said broil heating element for low heat output and said bake heating element for high heat in series with said high temperature thermostat during a preheat operation and said timer means automatically terminating said preheat operation and controlling said first and third switch means in a manner to energize said broil heating element for low heat output and said bake heating element for low heat output in series with said low temperature thermostat during an extended low temperature operation.

5. In combination with an oven, a circuit for low temperature roasting in said oven comprising, a broil heating element and a bake heating element in said oven, a high and low voltage power supply, a first thermostat calibrated for a first temperature range and selectively connected to one side of said heating elements, a second thermostat in parallel circuit relationship with said first thermostat and calibrated for a second temperature range higher than said first temperature range and selectively connected to said one side of said heating elements, means for connecting said thermostats to one side of said high and low voltage power supply, first means for selectively completing a circuit from the other side of one of said heating elements to the other side of said high or low voltage power supply, second means for connecting the other side of the other of said heating elements to said low voltage power supply, and a timer for automatically selectively connecting one of said thermostats to said one side of said heating elements and for switching said other side of one of said heating elements from said high voltage power supply to said low voltage power supply at the end of a predetermined time period.

6. In combination with an oven, a circuit for low temperature roasting in an oven comprising, a heating element in said oven, a high and low voltage power supply, a first thermostat calibrated for a first temperature range and selectively connected to one side of said heating element, a second thermostat in parallel circuit relationship with said first thermostat and calibrated for a second temperature range higher than said first temperature range and selectively connected to one side of said heating element, means for connecting said thermostats to one side of said high and low voltage power supply, means for selectively connecting the other side of said heating element to the other side of said high or low voltage power supply, and a timer for automatically selectively connecting one of said thermostats to one side of said heating element and for switching said other side of said heating element from said high voltage power supply to said low voltage power supply at the end of a predetermined time period.

7. In combination with an oven, a circuit for low temperature roasting in an oven comprising, a heating element in said oven, a high and low voltage power supply, a first thermostat calibrated for a first temperature range and selectively connected to one side of said heating element, a second thermostat in parallel circuit relationship with said first thermostat and calibrated for a second temperature range higher than said first temperature range and selectively connected to one side of said heating element, means for connecting said thermostats to one side of said high and low voltage power supply, means for selectively connecting the other side of said heating element to the other side of said high or low voltage power supply, and a timer for automatically selectively connecting one of said thermostats to one side of said heating element and for switching said other side of said heating element from one of said high or low voltage power supply to the other of said high or low voltage power supply at the end of a predetermined time period.

8. A control circuit for an oven having a first heating element and a second heating element in parallel circuit relationship comprising, a high temperature thermostat accurately responsive to high temperatures in said oven, a low temperature thermostat accurately responsive to low temperatures in said oven, said thermostats being in parallel circuit relationship with each other and in series circuit relationship with said heating elements, first switch means for connecting one of said thermostats with said heating elements, second switch means for selectively connecting said second heating element for low heat output, third switch means for selectively connecting said first heating element for high or low heat output, and timer means for controlling certain of said switch means in a manner to energize said second heating element for low heat output and said first heating element for high heat in series with said high temperature thersostat during a first operation and said timer means automatically terminating said first operation and controlling certain of said switch means in a manner to energize said second heating element for low heat output and said first heating element for low heat output in series with said low temperature thermostat during a second operation.

9. A control circuit for an oven having a first heating element and a second heating element in parallel circuit relationship comprising, a high temperature thermostat accurately responsive to high temperatures in said oven, a low temperature thermostat accurately responsive to low temperatures in said oven, said thermostats being in parallel circuit relationship with each other and in series circuit relationship with said heating elements, first switch means for connecting one of said thermostats with said heating elements, second switch means for selectively connecting one of said heating elements for low heat output, third switch means for selectively connecting the other of said heating elements for high or low heat output, and timer means for controlling certain of said switch means in a manner to energize said one of said heating elements for low heat output and said other of said heating elements for high heat output in series with said high temperature thermostat during a first operation and said timer means automatically terminating said first operation and controlling certain of said switch means in a manner to energize said one of said heating elements for low heat output and said other of said heating elements for low heat output in series with said low temperature thermostat during a second operation.

10. In combination with an oven, a control for oven heating means in a low temperature roasting circuit comprising, a first thermostat having a first cycling switch in series with said heating means, said first cycling switch means preset to cycle said heating means at a fixed predetermined temperature in said oven and calibrated to respond accurately to low temperatures in said oven, a second thermostat having a second cycling switch in series with said heating means and in parallel with said first cycling switch, said second cycling switch calibrated to respond accurately to high temperatures in said oven, and timing means for selectively placing one of said switches in control relationship with said heating means.

11. In combination with an oven, a control for oven heating means in a low temperature roasting circuit comprising, first cycling switch means in series with said heating means, said first cycling switch means preset to cycle said heating means at a fixed predetermined temperature in said oven and calibrated to respond accurately to low temperatures in said oven, second cycling switch means in series with said heating means and in parallel with said first cycling switch means, said second cycling switch means calibrated to respond accurately to high temperatures in said oven, and timing means for selectively placing one of said switch means in control relationship with said heating means.

References Cited in the file of this patent
UNITED STATES PATENTS

| | | |
|---|---|---|
| 2,767,293 | Jordan et al. | Oct. 16, 1956 |
| 2,798,929 | Wojcik | July 9, 1957 |
| 2,870,313 | McCormick | Jan. 20, 1959 |
| 3,032,636 | Schauer | May 1, 1962 |